United States Patent
Saito (10) Patent No.: US 10,086,464 B2
(45) Date of Patent: Oct. 2, 2018

(54) ANALYZING METHOD AND APPARATUS FOR OPTIMIZING WELDING POSITION OF STRUCTURE

(71) Applicant: JFE STEEL CORPORATION, Chiyoda-ku, Tokyo (JP)

(72) Inventor: Takanobu Saito, Chiba (JP)

(73) Assignee: JFE Steel Corporation, Tokyo (JP)

( * ) Notice: Subject to any disclaimer, the term of this patent is extended or adjusted under 35 U.S.C. 154(b) by 614 days.

(21) Appl. No.: 14/440,512

(22) PCT Filed: Nov. 6, 2012

(86) PCT No.: PCT/JP2012/007101
§ 371 (c)(1),
(2) Date: May 4, 2015

(87) PCT Pub. No.: WO2014/073018
PCT Pub. Date: May 15, 2014

(65) Prior Publication Data
US 2015/0298236 A1 Oct. 22, 2015

(51) Int. Cl.
*G06F 17/50* (2006.01)
*B23K 9/095* (2006.01)
(Continued)

(52) U.S. Cl.
CPC ............ *B23K 9/0953* (2013.01); *B23K 11/24* (2013.01); *G05B 19/19* (2013.01); *G06F 17/50* (2013.01);
(Continued)

(58) Field of Classification Search
CPC ....... B23K 9/0953; B23K 11/24; G06F 17/50; G06F 17/5018; G06F 17/5095;
(Continued)

(56) References Cited

U.S. PATENT DOCUMENTS 8,126,684 B2 2/2012 Goel
2010/0224610 A1* 9/2010 Wallace ............... B23K 9/0953
219/137 R
(Continued)

FOREIGN PATENT DOCUMENTS

CN 102012958 A 4/2011
EP 2251805 A2 11/2010
(Continued)

OTHER PUBLICATIONS

International Search Report for International Application No. PCT/JP2012/007101 dated Jan. 15, 2013.
(Continued)

*Primary Examiner* — Ziaul Karim
(74) *Attorney, Agent, or Firm* — RatnerPrestia (57) ABSTRACT

Aspects of the present invention include a welding-position optimization analyzing method for spot welding or continuous welding of components constituting a structure model formed of plane elements and/or three-dimensional elements. The method includes defining a to-be-analyzed portion including welding points or welding portions at which the plurality of components are welded; defining at least one of the welding points or at least one of the welding portions in the defined to-be-analyzed portion as a fixed welding point or a fixed welding portion; specifying welding prospects in the to-be-analyzed portion, the welding prospects being regarded as prospects for the welding points or the welding portions; defining an analytic condition applied to the to-be-analyzed portion; and analyzing and/or calculating an optimal welding point or an optimal welding portion that satisfies the analytic condition from among the welding prospects.

14 Claims, 6 Drawing Sheets

(51) Int. Cl.
    *B23K 11/24*    (2006.01)
    *G05B 19/19*    (2006.01)
(52) U.S. Cl.
    CPC ...... *G06F 17/5018* (2013.01); *G06F 17/5095* (2013.01); *G05B 2219/45135* (2013.01); *G06F 2217/12* (2013.01); *Y02P 90/265* (2015.11)
(58) Field of Classification Search
    CPC ............... G06F 2217/12; G05B 19/19; G05B 2219/45135; Y02P 90/265
    USPC ........................................................ 700/160
    See application file for complete search history.

(56) References Cited

U.S. PATENT DOCUMENTS

2010/0262406 A1* 10/2010 Goel .................. G06F 17/5018
                                                                703/2
2013/0000415 A1* 1/2013 Yoshida .................. B23K 11/11
                                                                73/827

FOREIGN PATENT DOCUMENTS

| JP | 2010250818 | 11/2010 |
|---|---|---|
| JP | 2011121086 | 6/2011 |
| JP | 2011221644 | 11/2011 |

OTHER PUBLICATIONS

Cui et al., "The Layout and Fatigue Life Analysis of Welding Spots for the Cab Body in White of a Commercial Vehicle", 2011 International Conference on Electronic & Mechanical Engineering and Information Technology,, Aug. 12, 2011, pp. 2089-2093.
Will et al., Genetisce Optimierung von punktgeschweibten Strukturen im Fahreufbau, 20th CAD-FEM Users Meeting 2002, International Congress on FEM Technology, Oct. 11, 2002, pp. 1-16.
Extended European Search Report dated Feb. 12, 2016 for European Application No. 12888102.6.
Choi et al., "Shape Design Optimization of Joining Mechanism Using Doubly Curved Shell", Computers and Structures, vol. 77, No. 5, Jul. 1, 2000 (Abstract Only).
Chinese Office Action for Chinese Application No. 201280076914.5, dated May 2, 2017, with Concise Statement of Search Report, 10 Pages.
Lv et al., "Multi-Doamin Synthetic Topology Optimization Method for Automotive Body Spot Welding Layout Design", Chinese Journal of Computational Mechanics, vol. 27, No. 4, pp. 648-654.
Chen et al., "Application of Topology Optimization to a SRV BIW Aiming at Welding Spot Reduction", Automotive Engineering, vol. 33, No. 8, pp. 733-737.

* cited by examiner

ANALYZING METHOD AND APPARATUS FOR OPTIMIZING WELDING POSITION OF STRUCTURE

CROSS REFERENCE TO RELATED APPLICATIONS

This is the U.S. National Phase application of PCT/JP2012/007101, filed Nov. 6, 2012, the disclosure of this application being incorporated herein by reference in its entirety for all purposes.

FIELD OF THE INVENTION

The present invention relates to an analyzing method and an apparatus for optimizing a welding position of a structure, mainly relates to an analyzing method and an apparatus for optimizing a welding position formed by such as spot welding, or a continuous welding such as laser welding, arc welding, or weldbonding.

BACKGROUND OF THE INVENTION

In consideration of environmental problems in the automotive industry, in particular, weight reduction of automotive bodies has progressed in recent years and analysis using a computer-aided engineering (referred to as "CAE analysis", below) is a technology indispensable to automotive body designing.

It is known that the CAE analysis involves optimization technology such as mathematical optimization, thickness optimization, shape optimization, or topology optimization to enhance the rigidity or to reduce the weight and is often used for optimizing the structure of castings such as an engine block.

Among optimization technologies, an attention is particularly paid to topology optimization. The topology optimization is a method that includes installing a three-dimensional element in a design space of a certain size and forming an optimal shape that satisfies given conditions by leaving minimum part of the three-dimensional element that satisfies the given conditions. Thus, the topology optimization is a method that includes directly restricting a three-dimensional element forming a design space and directly applying a load to the three-dimensional element.

As an example of the technology related to such topology optimization, Patent Literature 1 discloses a method for topology optimization of components of a complex structure.

PATENT LITERATURE

PTL 1: Japanese Unexamined Patent Application Publication No. 2010-250818

SUMMARY OF THE INVENTION

A structure such as an automotive body forms a single structure while having multiple components welded together by, for example, welding and it is known that its rigidity is enhanced with an increase of the amount of welding positions. From the cost point of view, however, as small an amount as possible of welding positions is desired.

Examples of a method for defining welding positions between components include a method for defining welding positions at equal intervals, a method for defining welding positions from experience or intuition, or a method for adding welding positions at positions defined to receive a large stress through stress analysis.

However, the method for defining welding positions at equal intervals or the method for defining welding positions from experience or intuition is not a method for defining welding positions by finding positions that require welding for rigidity improvement, whereby welding positions are defined at undesired positions. Thus, such a method is inefficient from the cost point of view.

Meanwhile, in the method for adding welding positions at positions defined to receive a large stress through stress analysis, only the vicinities of portions that have been added as welding positions enhance their characteristics compared to the characteristics before the portions are added as welding positions. However, the characteristics of other portions are relatively lowered. Thus, from the overall evaluation view point, this method cannot be said as optimizing welding positions.

Thus, none of existing technologies are usable for defining optimal positions for characteristics enhancement.

The use of optimization technology disclosed in Patent Literature 1 is thus conceivable. However, none of documents disclose how optimization technology is applied to optimization of welding positions and thus the development of such a technology has been awaited.

Aspects of the present invention solve the above-described problems and aim to provide welding-position optimization technology capable of calculating optimal positions in spot welding or continuous welding used to weld together multiple components constituting a structure model formed of plane elements and/or three-dimensional elements.

To accomplish the above object, aspects of the present invention provide a welding-position optimization analyzing method and a welding-position optimization analyzing apparatus, which are described below with reference to exemplary embodiments.

(1) A welding-position optimization analyzing method for optimizing spot welding or continuous welding used to weld together a plurality of components constituting a structure model formed of plane elements and/or three-dimensional elements, the method including a to-be-analyzed-portion defining step of defining a to-be-analyzed portion including welding points or welding portions at which the plurality of components are welded together; a fixed-welding defining step of defining at least one of the welding points or at least one of the welding portions in the defined to-be-analyzed portion as a fixed welding point or a fixed welding portion; a welding-prospect specifying step of specifying welding prospects in the to-be-analyzed portion, the welding prospects being regarded as prospects for the welding points or the welding portions; an analytic-condition applying step of defining an analytic condition applied to the to-be-analyzed portion; and an analysis step of calculating an optimal welding point or an optimal welding portion that satisfies the analytic condition from among the welding prospects.

(2) A welding-position optimization analyzing method for optimizing spot welding or continuous welding used to weld together a plurality of components constituting a structure model formed of plane elements and/or three-dimensional elements, the method including a welding-prospect specifying step of specifying welding prospects regarded as prospects for welding points or welding portions at which the plurality of components are welded together; a to-be-analyzed-portion defining step of defining a to-be-analyzed portion including the specified welding prospects; a fixed-welding defining step of defining at least one of the welding points or at least one of the welding portions in the defined to-be-analyzed portion as a fixed welding point or a fixed welding portion; an analytic-condition applying step of defining an analytic condition applied to the to-be-analyzed portion; and an analysis step of calculating, an optimal welding point or an optimal welding portion that satisfies the analytic condition from among the welding prospects.

(3) A welding-position optimization analyzing method for optimizing spot welding or continuous welding used to weld together a plurality of components constituting a structure model formed of plane elements and/or three-dimensional elements, the method including a welding-prospect specifying step of specifying welding prospects regarded as prospects for welding points or welding portions at which the plurality of components are welded; a to-be-analyzed-portion defining step of defining a to-be-analyzed portion including the specified welding prospects; a fixed-welding defining step of defining at least one of the welding points or at least one of the welding portions in the defined to-be-analyzed portion as a fixed welding point or a fixed welding portion; a welding-prospect respecifying step of respecifying welding prospects regarded as prospects for welding points or welding portions in the to-be-analyzed portion; an analytic-condition applying step of defining an analytic condition applied to the to-be-analyzed portion; and an analysis step of calculating an optimal welding point or an optimal welding portion that satisfies the analytic condition from among the respecified welding prospects.

(4) The welding-position optimization analyzing method according to paragraph (3), wherein the welding-prospect redefining step includes a welding generating step of generating the welding points or the welding portions, and wherein the welding generating step includes a step of defining, from node coordinates of plane elements constituting each of the components, representative nodes of the elements and a step of disposing a welding element between plane elements spaced such a distance apart as to allow the welding element to be weldbonded after calculating, from coordinate values, an inter-node distance between a representative node of one of the plane elements of the component, used as a reference, and each of the representative nodes of plane elements of other components.

(5) The welding-position optimization analyzing method described in any one of the paragraphs (1) to (4), wherein the analysis step includes discretization using a discretization coefficient defined as four or higher.

(6) The welding-position optimization analyzing method described in any one of the paragraphs (1) to (5), wherein in the fixed-welding defining step, a structure analysis is performed on the plurality of welded components and the fixed welding point or the fixed welding portion is defined on the basis of a result of the structure analysis.

(7) The welding-position optimization analyzing method described in any one of the paragraphs (1) to (6), wherein in the fixed-welding defining step, an optimization calculation using numerical analysis is performed on all welding elements in the plurality of welded components and the fixed welding point or the fixed welding portion is defined on the basis of the optimization calculation.

(8) The welding-position optimization analyzing method described in any one of the paragraphs (1) to (7), wherein the welding-prospect defining step includes a welding generating step of generating the welding points or the welding portions, and
wherein the welding generating step includes a step of defining, from node coordinates of plane elements constituting each of the components, representative nodes of the elements and a step of disposing a welding element between plane elements spaced such a distance apart as to allow the welding element to be weldbonded after calculating, from coordinate values, an inter-node distance between a representative node of one of the plane elements of the component, used as a reference, and each of the representative nodes of plane elements of other components.

(9) An analyzing apparatus that optimizes spot welding or continuous welding used to weld together a plurality of components constituting a structure model formed of plane elements and/or three-dimensional elements, the apparatus including a to-be-analyzed-portion defining unit that defines a to-be-analyzed portion including welding points or welding portions at which the plurality of components are welded together; a fixed-welding defining unit that defines at least one of the welding points or at least one of the welding portions in the defined to-be-analyzed portion as a fixed welding point or a fixed welding portion; a welding-prospect specifying unit that specifies welding prospects in the to-be-analyzed portion, the welding prospects being regarded as prospects for the welding points or the welding portions; an analytic-condition applying unit that defines an analytic condition that is to be applied to the to-be-analyzed portion; and an optimization analyzing unit that calculates an optimal welding point or an optimal welding portion that satisfies the analytic condition from among the welding prospects.

(10) An analyzing apparatus that optimizes spot welding or continuous welding used to weld together a plurality of components constituting a structure model formed of plane elements and/or three-dimensional elements, the apparatus including a welding-prospect specifying unit that specifies welding prospects regarded as prospects for welding points or welding portions at which the plurality of components are welded; a to-be-analyzed-portion defining unit that defines a to-be-analyzed portion including the specified welding prospects; a fixed-welding defining unit that defines at least one of the welding points or at least one of the welding portions in the defined to-be-analyzed portion as a fixed welding point or a fixed welding portion; an analytic-condition applying unit that defines an analytic condition applied to the to-be-analyzed portion; and an optimization analyzing unit that calculates an optimal welding point or an optimal welding portion that satisfies the analytic condition from among the welding prospects.

(11) An analyzing apparatus that optimizes spot welding or continuous welding used to weld together a plurality of components constituting a structure model formed of plane elements and/or three-dimensional elements, the apparatus including a welding-prospect specifying unit that specifies welding prospects regarded as prospects for welding points or welding portions at which the plurality of components are welded; a to-be-analyzed-portion defining unit that defines a to-be-analyzed portion including the specified welding prospects; a fixed-welding defining unit that defines at least one of the welding points or at least one of the welding portions in the defined to-be-analyzed portion as a fixed welding point or a fixed welding portion; a welding-prospect respecifying unit that respecifies welding prospects regarded as prospects for welding points or welding portions in the to-be-analyzed portion; an analytic-condition applying unit that defines an analytic condition applied to the to-be-analyzed portion; and an optimization analyzing unit that calculates an optimal welding point or an optimal welding portion that satisfies the analytic condition from among the respecified welding prospects.

(12) The analyzing apparatus described in the paragraph (11), wherein the welding-prospect redefining unit includes a welding generating unit that generates the welding points or the welding portions, and wherein the welding generating unit defines, from node coordinates of plane elements constituting each of the components, representative nodes of the elements and disposes a welding element between plane elements spaced such a distance apart as to allow the welding element to be weldbonded after calculating, from coordinate values, an inter-node distance between a representative node of one of the plane elements of the component, used as a reference, and each of the representative nodes of plane elements of other components.

(13) The analyzing apparatus described in any one of the paragraphs (9) to (12), wherein the optimization analyzing unit performs discretization using a discretization coefficient defined as four or higher.

(14) The welding-position optimization analyzing apparatus described in any one of the paragraphs (9) to (13), wherein the fixed-welding defining unit performs a structure analysis on the plurality of welded components and defines the fixed welding point or the fixed welding portion on the basis of a result of the structure analysis.

(15) The welding-position optimization analyzing apparatus described in any one of the paragraphs (9) to (13), wherein the fixed-welding defining unit performs an optimization calculation using numerical analysis on all welding elements in the plurality of welded components and defines the fixed welding point or the fixed welding portion on the basis of the optimization calculation.

(16) The welding-position optimization analyzing apparatus described in any one of the paragraphs (9) to (15), wherein the welding-prospect defining unit includes a welding generating unit that generates the welding points or the welding portions, and wherein the welding generating unit defines, from node coordinates of plane elements constituting each of the components, representative nodes of the elements and disposes a welding element between plane elements spaced such a distance apart as to allow the welding element to be weldbonded after calculating, from coordinate values, an inter-node distance between a representative node of one of the plane elements of the component, used as a reference, and each of the representative nodes of plane elements of other components.

One or more embodiments of the present invention can define optimal welding positions for enhancement of the characteristics of a structure by including a to-be-analyzed-portion defining step of defining a to-be-analyzed portion including welding points or welding portions at which the plurality of components are welded together; a fixed-welding defining step of defining at least one of the welding points or at least one of the welding portions in the defined to-be-analyzed portion as a fixed welding point or a fixed welding portion; a welding-prospect specifying step of specifying welding prospects in the to-be-analyzed portion, the welding prospects being regarded as prospects for the welding points or the welding portions; an analytic-condition applying step of defining an analytic condition applied to the to-be-analyzed portion; and an analysis step of calculating an optimal welding point or an optimal welding portion that satisfies the analytic condition from among the welding prospects.

DETAILED DESCRIPTION OF EMBODIMENTS OF THE INVENTION

Referring now to the drawings, embodiments of the present invention will be described.

Figure 1:
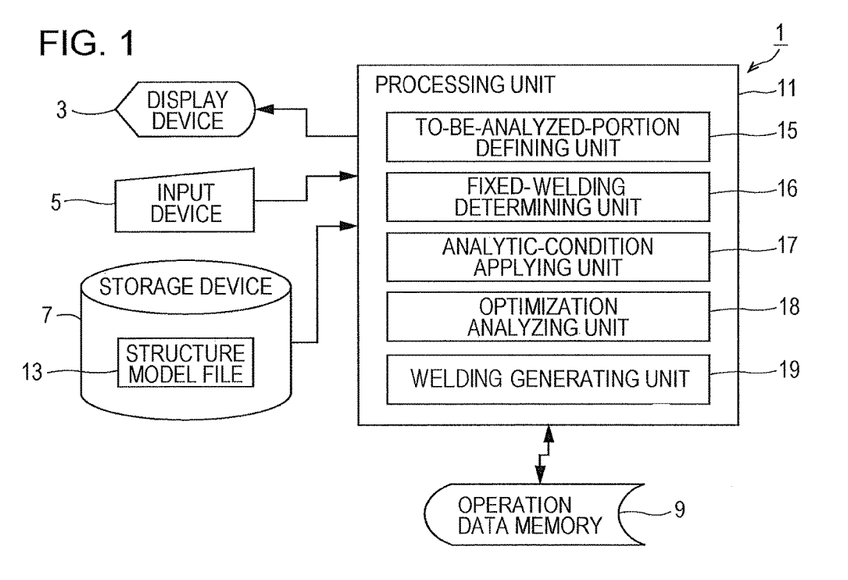
FIG. 1 is a block diagram of a welding-position optimization analyzing apparatus according to an embodiment of the present invention.
Figure 5:
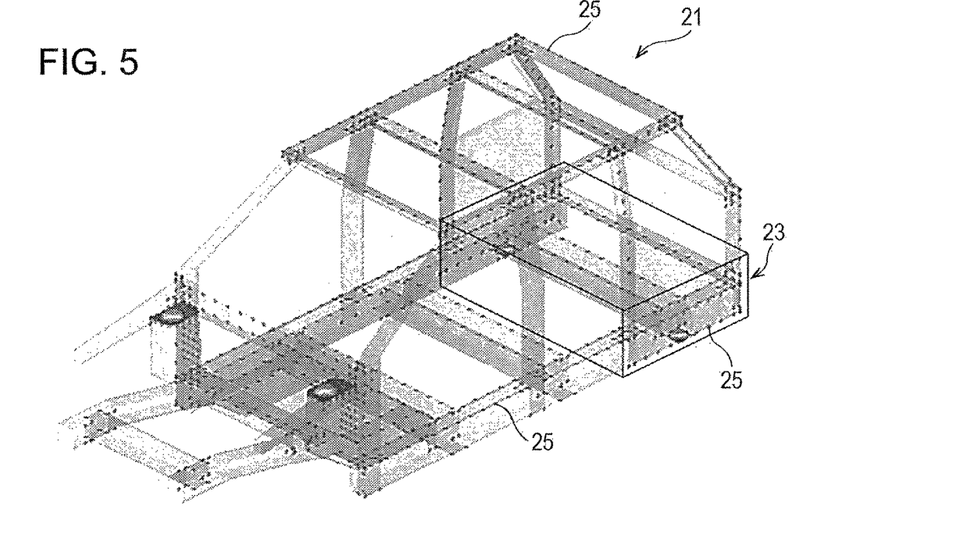
FIG. 5 illustrates an example of a structure model.

Referring mainly to the block diagram illustrated in FIG. 1, the configuration of an optimization analyzing apparatus 1 that analyzes optimization of welding multiple components is firstly described with a case, taken as an example, of optimizing spot welding between multiple components of an automotive-body structure model 21 illustrated in FIG. 5. The optimization analyzing apparatus 1 that analyzes optimization of welding multiple components is simply referred to as a "welding optimization analyzing apparatus 1", below.

The welding optimization analyzing apparatus 1 according to the embodiment is an apparatus that optimizes welding positions between multiple components and is formed of a personal computer (PC). The welding optimization analyzing apparatus 1 includes a display device 3, an input device 5, a storage device 7, an operation data memory 9, and a processing unit 11.

The display device 3, the input device 5, the storage device 7, and the operation data memory 9 are connected to the processing unit 11 and operate according to commands of the processing unit 11.

<Display Device>

The display device 3 is used for displaying calculation results or for other purposes, and is, for example, a liquid crystal monitor.

<Input Device>

The input device 5 is used when a structure model file 13 is instructed to be displayed or when an operator inputs conditions, or in other cases. The input device 5 includes components such as a keyboard and a mouse.

<Storage Device>

The storage device 7 is used for storing files or for other purposes, and is, for example, a hard disk. The storage device 7 stores various types of information at least including a structure model file 13. FIG. 5 illustrates an example of the structure model file 13 displayed on the display device. The structure model 21 may be formed only of plane elements or may be formed of a combination of plane elements and three-dimensional elements. When, for example, an automotive body (body) illustrated in FIG. 5 is taken as an example of the structure model 21, the automotive body is mainly made of steel sheets and the structure model 21 is thus formed of plane elements. On the other hand, a block body formed of castings such as an engine is formed of three-dimensional elements. The structure model 21 illustrated in FIG. 5 is an example in which components constituting the structure model 21 are welded together at initial welding points 25 at the pitch of 40 mm.

<Operation Data Memory>

The operation data memory 9 is used for temporarily storing or calculating data used in the processing unit 11 or for other purposes and is, for example, a random access memory (RAM).

<Processing Unit>

The processing unit 11 is a central processing unit (CPU) of, for example, a personal computer (PC) and each of the units described below are implemented with the CPU executing a predefined program.

The processing unit 11 includes a to-be-analyzed-portion defining unit 15, a fixed-welding defining unit 16, a welding generating unit 19, an analytic-condition applying unit 17, and an optimization analyzing unit 18.

The to-be-analyzed-portion defining unit 15 defines a to-be-analyzed portion 23 including welding points or welding portions at which multiple components are welded together.

The fixed-welding defining unit 16 defines at least one of the welding points or welding portion in the defined to-be-analyzed portion 23 as a fixed welding point or a fixed welding portion.

Figure 7:
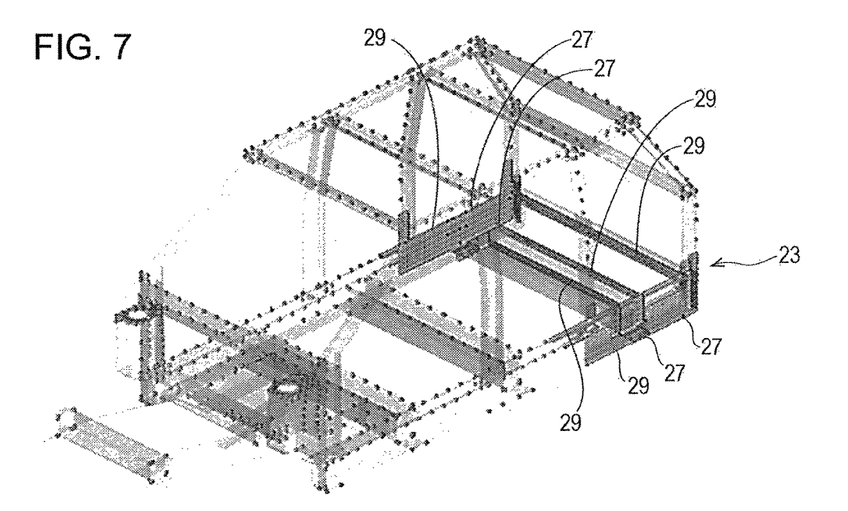
FIG. 7 illustrates the model in a state where a welding portion is generated after a fixed welding point is defined in accordance with an embodiment of the present invention.

The welding generating unit 19 defines welding prospects 29 illustrated in FIG. 7 in the to-be-analyzed portion 23.

The analytic-condition applying unit 17 defines an analytic condition applied to the to-be-analyzed portion 23.

The optimization analyzing unit 18 performs discretization to calculate for optimizing an optimal welding point or an optimal welding position that satisfies the analytic condition.

Here, the welding point is formed in the case of spot welding whereas the welding portion is formed in the case of continuous welding. In the following description, the welding point is mainly described as an example. The present invention, however, is also applicable to the continuous welding.

The configuration of components is described in detail with reference to exemplary embodiments.

[To-be-Analyzed-Portion Defining Unit]

The to-be-analyzed-portion defining unit 15 defines a portion of the structure model 21 that is to be optimized as a to-be-analyzed portion 23. In the structure model 21 illustrated in FIG. 5, a portion surrounded by a rectangle is illustrated at a portion below the floor in a center portion of an automotive body. In this example, this portion is a portion serving as a to-be-analyzed portion 23.

[Fixed-Welding Defining Unit]

The fixed-welding defining unit 16 selects fixed welding points 27 illustrated in FIG. 6 as significant welding points from among prefixed welding portions (hereinafter referred to as "initial welding points 25"). The reason why the fixed welding points 27 are selected is based on the finding that selecting one or more absolutely welded welding portions as preprocessing of the optimization analysis leads to an appropriate performance of the optimization analysis.

The fixed welding points 27 are defined on the basis of the result of a simple structure analysis or topology optimization.

In the case where the simple structure analysis is used to define the fixed welding points 27, the fixed welding points 27 are defined in the following manner. Firstly, the simple structure analysis such as a rigidity analysis is performed to calculate the properties of each of the initial welding points 25 such as the stress, the strain, the strain energy, or the load. Subsequently, the calculated results are sequenced and a prefixed number of fixed welding points 27 are selected in descending order from a fixed welding point 27 having the highest sequence. The number of fixed welding points 27 is one or higher.

In the case where the topology optimization is used to define the fixed welding points 27, analysis is performed on all the initial welding points 25 and a prefixed number of significant points having high densities are selected as fixed welding points 27.

Figure 6:
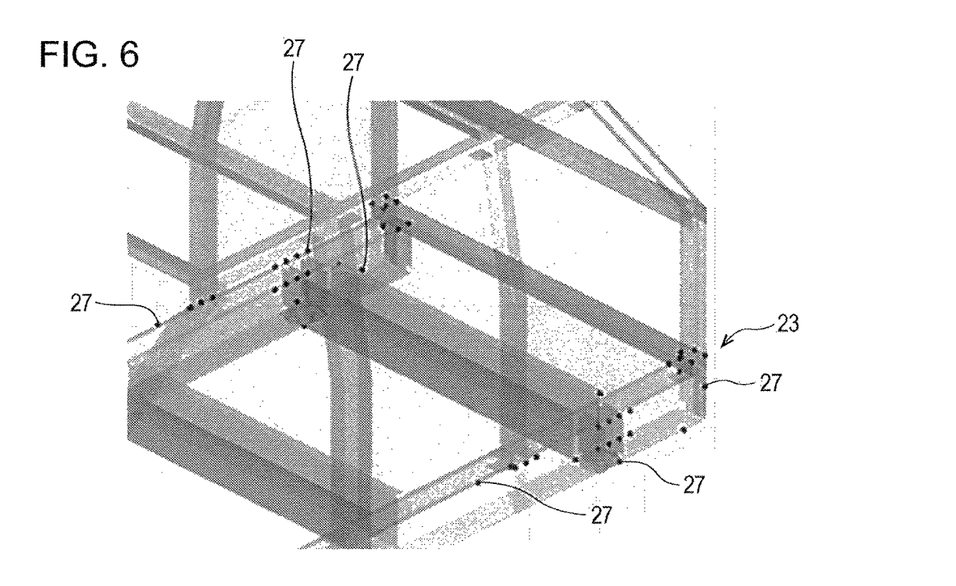
FIG. 6 illustrates the model in a state where a fixed welding point is defined in accordance with an embodiment of the present invention.

After the fixed-welding defining unit 16 performs fixed-welding defining processing, fixed welding points 27 are defined as illustrated in FIG. 6.

[Welding Generating Unit]

The welding generating unit 19 corresponds to one aspect of a welding-prospect specifying unit according to embodiments of the present invention.

The welding generating unit 19 specifies welding prospects 29 illustrated in FIG. 7 between two components (hereinafter referred to as a "component A" and a "component B"). The procedure of specifying welding prospects 29 is described referring to the flowchart illustrated in FIG. 2.

Figure 2:
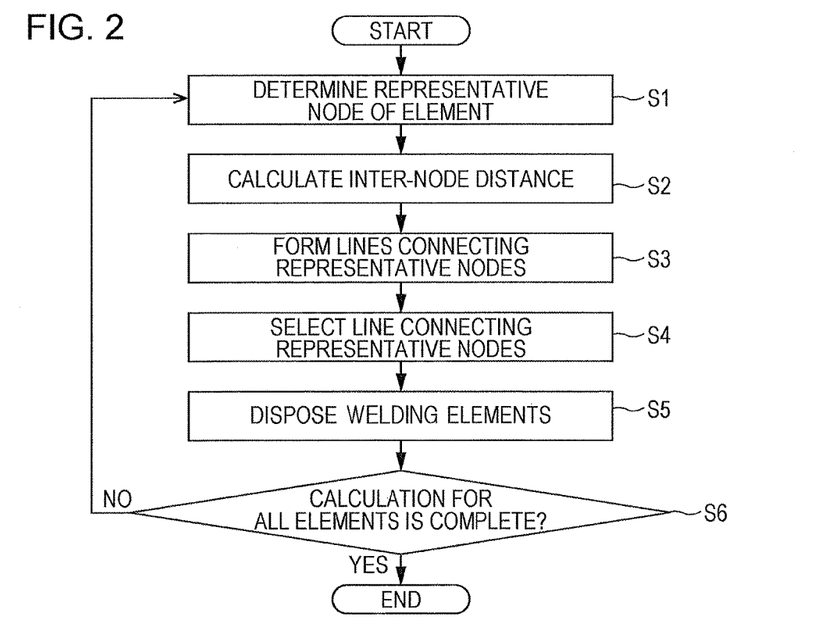
FIG. 2 is a flowchart illustrating a processing flow of a welding generating unit of the welding-position optimization analyzing apparatus according to the embodiment of the present invention.

Firstly, the center point and the gravity center point are calculated from the node coordinates of each plane element on each component to define the representative nodes of the element. Alternatively, integral node coordinates obtained by a finite element method (FEM) analysis may be used (Step S1).

Subsequently, an inter-node distance between each representative node of one plane element a on the component A and the representative node of each of all the plane elements on the component B is calculated from the coordinate values (Step S2).

Subsequently, a line connecting the representative nodes spaced apart an inter-node distance having the total of X mm and the sum of halves of the sheet thicknesses of the components is formed as a connection line (Step S3). The reason why the inter-node distance is restricted is to select the points that are capable of being welded in actual welding. It is preferable in the case of spot welding that X<3 mm, it is preferable in the case of laser welding that X<3 mm, it is preferable in the case of arc welding that X<6 mm, and it is preferable in the case of weldbonding that X<6 mm.

Subsequently, an angle between each connection line and the plane element is calculated and the connection lines that form angles ranging from 50 to 90° are selected (Step S4).

Similarly to the reason why the inter-node distance is restricted, the reason why the angle is restricted is to select the points that are capable of being welded in actual welding.

Subsequently, the point is defined at the center of each of the selected connection lines and welding elements are disposed using meshing software and welding prospects 29 are defined (Step S5).

Subsequently, Step S1 to Step S5 are sequentially performed on all the plane elements on the component A other than the plane element a that has been subjected to calculation once (Step S6).

The processing in which the welding generating unit 19 illustrated in FIG. 1 generates welding prospects 29 illustrated in FIG. 7 is also performed in the case where the structure model 21 itself illustrated in FIG. 5 includes multiple components but welding points are not defined at the processing. If initial welding points are defined in advance, such processing is performed before performing optimization processing on to-be-welded portions.

FIG. 7 illustrates the state where the welding generating unit 19 has generated welding prospects 29 in the to-be-analyzed portion 23.

In the case where welding prospects 29 are defined by the welding generating unit 19, the number of welding prospects 29 may be defined depending on properties such as the volume of the to-be-analyzed portion 23 or may be a largest possible number within a definable range.

[Analytic-Condition Applying Unit]

The analytic-condition applying unit 17 inputs an analytic condition for optimization calculation. Examples of the analytic condition include the position at which the structure is constrained, the position at which the load is applied, the volume fraction of the material, maximizing the rigidity, minimizing the displacement, and minimizing the stress.

Figure 11:
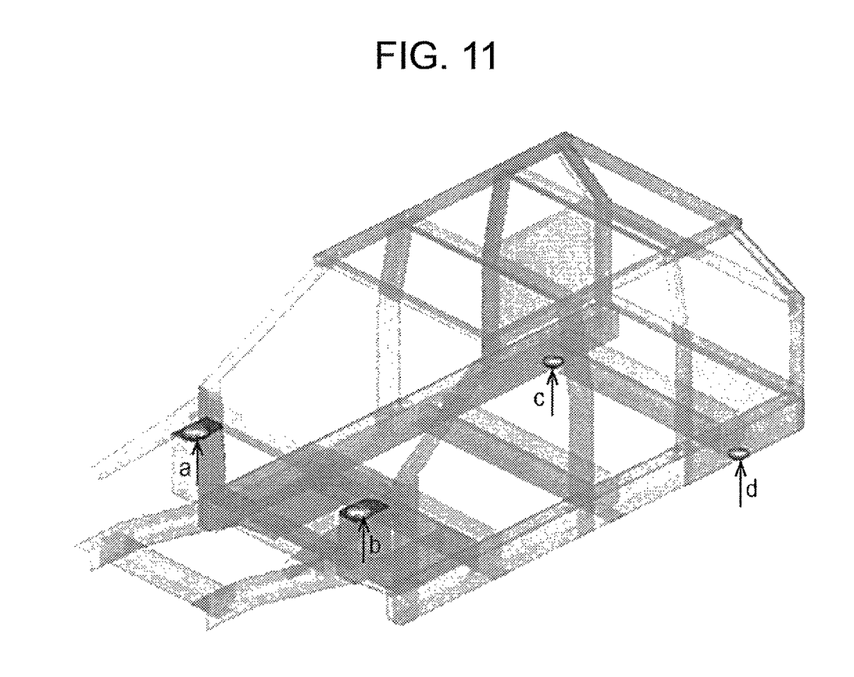
FIG. 11 illustrates load and constraint conditions as an example of analytic conditions.

To calculate, for example, a maximum rigidity of the to-be-analyzed portion 23 under the condition that a torsional load is applied to the structure model 21 (automotive body), the following conditions are used: four positions (a, b, c, and d) of the structure model 21 are defined as illustrated in FIG. 11, three positions among the four positions are constrained, and a load is applied to the remaining one position.

[Optimization Analyzing Unit]

The optimization analyzing unit 18 performs optimization analysis on the basis of the analytic condition defined by the analytic-condition applying unit 17 to be applied to the welding prospects 29 located within the to-be-analyzed portion 23 to select optimal welding points 31.

Usable examples of the optimization analyzing method include topology optimization. When the topology optimization is used, it is preferable that discretization is performed while a penalty coefficient of the element is defined as four or higher.

When a density-based topology optimization is used and intermediate densities account for a large proportion, discretization is preferable and the calculation is expressed by the following formula (1):

$$\underline{K}(\rho) = \rho^p K \quad (1),$$

where $\underline{K}$ denotes a matrix resulting by imposing a penalty on a rigidity matrix of an element, K denotes the rigidity matrix of the element, $\rho$ denotes the density, and p denotes the penalty coefficient.

The penalty coefficient frequently used in the discretization is two or higher, but it was found in this invention that a value four or higher is preferred for welding optimization as a penalty coefficient.

The optimization analyzing unit 18 may perform topology optimization processing or optimization processing involving other calculation methods. Thus, commercially available analysis software using finite elements is usable as an example of the optimization analyzing unit 18.

Figure 10:
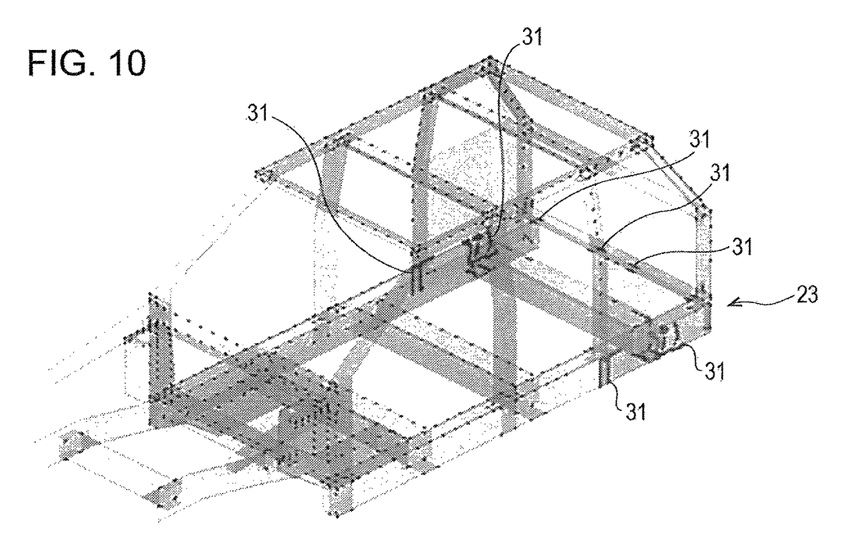
FIG. 10 illustrates the model in a state where analysis processing has been performed on the model in the state illustrated in FIG. 9 to calculate optimal welding points.

When the welding generating unit 19 generates welding prospects 29 in the to-be-analyzed portion 23 (see FIG. 7) and optimization analysis processing is performed on the welding prospects 29, optimal welding points 31 illustrated in FIG. 10 that satisfy the applied analytic condition are left among the welding prospects 29 specified in the to-be-analyzed portion 23 illustrated in FIG. 7.

Figure 3:
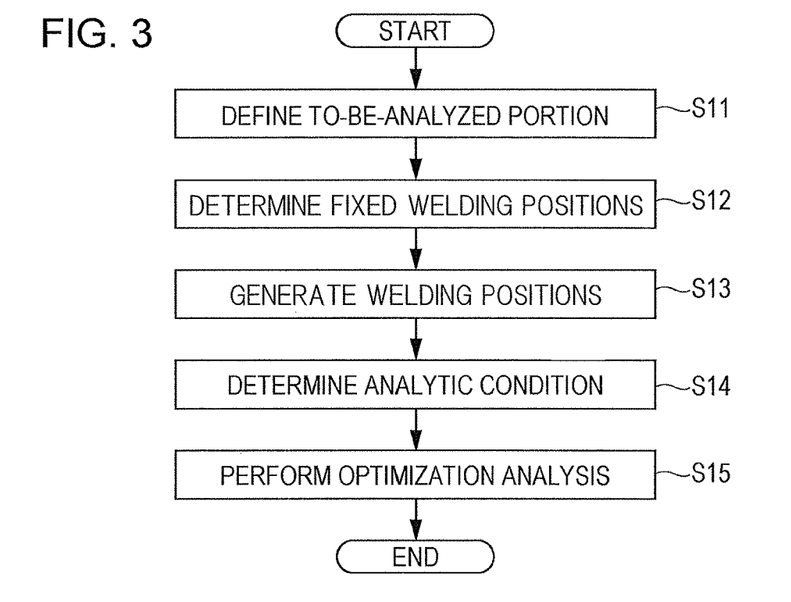
FIG. 3 is a flowchart illustrating a processing flow of the welding-position optimization analyzing apparatus according to the embodiment of the present invention.

Referring now to the flowchart illustrated in FIG. 3, a welding optimization analyzing method using the welding optimization analyzing apparatus 1 is described taking a case, as an example, of optimizing welding positions between multiple components of the structure model 21 illustrated in FIG. 5. Here, as illustrated in FIG. 5, the initial welding points 25 are defined in advance at a pitch of 40 mm. The processing described below is performed in response to an operator instructing a PC through the input device 5 so that each function of the processing unit 11 in the PC performs processing.

When an operator instructs the PC through the input device 5 to read a file of the structure model 21 that is to be subjected to analysis processing, the structure model 21 is read from the storage device 7 and displayed on the display device 3.

The operator instructs the PC to define a to-be-analyzed portion 23, which is to be subjected to optimization processing, in the displayed structure model 21. In response to this instruction, the to-be-analyzed-portion defining unit 15 defines the portion that is to be subjected to optimization processing as a to-be-analyzed portion 23 (S11).

When the to-be-analyzed portion 23 is defined, the operator instructs the PC to define fixed welding points 27 from among the initial welding points 25 located in the to-be-analyzed portion 23. Upon receipt of this instruction, the fixed-welding defining unit 16 defines a predefined number of fixed welding points 27, the number of which has been defined by the above-described simple structure analysis or topology optimization (see FIG. 6) (S12).

When the fixed welding points 27 are defined, the operator instructs the PC to specify welding prospects 29 in the to-be-analyzed portion 23. Upon receipt of the instruction, the welding generating unit 19 generates welding prospects 29 (see FIG. 7) in the to-be-analyzed portion 23 by the above-described processing (S13).

Subsequently, the operator defines an analytic condition using the analytic-condition applying unit 17 (S14). Examples of the analytic condition include, as described above, the position at which the structure is constrained, the position at which the load is applied, the volume fraction of the material, maximizing the rigidity, minimizing the displacement, and minimizing the stress. When the operator finishes inputting the analytic condition, the operator instructs the PC to perform the analysis.

Figure 8:
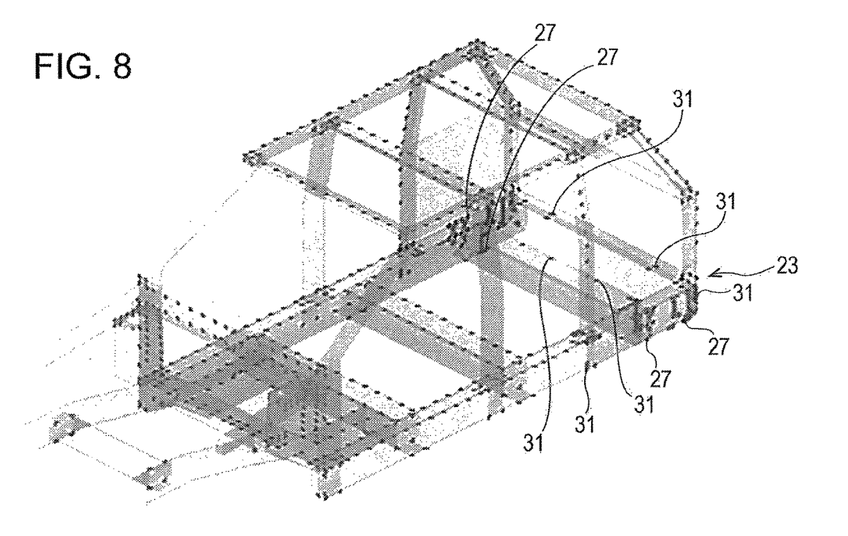
FIG. 8 illustrates the model in a state where analysis processing has been performed on the model in the state illustrated in FIG. 7 to calculate optimal welding points.

Upon receipt of the instruction, the optimization analyzing unit 18 performs calculation of the optimization analysis (S15). After the optimization calculation, required welding points from among the welding prospects 29 are displayed on the display unit (see FIG. 8).

The operator constructs a model using the welding points obtained by the optimization calculation and estimates the rigidity on the basis of the model.

As described above, in this embodiment, optimization analysis processing is performed by defining a portion subjected to welding optimization in the structure model 21 as a to-be-analyzed portion 23, defining fixed welding points 27 in the defined to-be-analyzed portion 23, and generating welding prospects 29 in the to-be-analyzed portion 23. Thus, analysis processing for optimizing welding points can be appropriately performed.

Thus, welding portions in, for example, an automotive body structure can be optimized and the welding cost can be reduced.

In the above description, a case has been taken as an example where the initial welding points 25 have been defined in the structure model 21 in advance at a pitch of 40 mm and a case has been taken as an example where the fixed-welding defining unit 16 defines a predefined number of fixed welding points 27, the number of which has been defined by a simple structure analysis or topology optimization, from among the initial welding points 25.

However, the method for defining a fixed welding point or a fixed welding portion in the fixed-welding defining step according to the present invention is not limited to the above-described example. The operator may define a desired portion that is different from the initial welding points 25 as a fixed welding point or a fixed welding portion through the input device 5.

Alternatively, the operator may input appropriate portions different from the initial welding points 25 as prospects for fixed welding points or fixed welding portions through the input device 5 and may define a predefined number of fixed welding points 27, the number of which has been defined by a simple structure analysis or topology optimization, from among the input prospects.

Alternatively, the welding generating unit 19 may generate prospects for fixed welding points or fixed welding portions and a predefined number of fixed welding points 27, the number of which has been defined by a simple structure analysis or topology optimization, may be defined from among the generated prospects.

In the above description, the case where the initial welding points 25 have been defined in advance in the structure model 21 includes, in addition to the case, for example, where a person different from an operator defines initial welding points in advance, the case where an operator or the like defines welding points in addition to initial points that have been defined by another person.

The above embodiments have described the case where components constituting the automotive-body structure model 21 are initially welded together in advance, as illustrated in FIG. 5.

In some structure models 21, however, components constituting each structure model 21 are not welded together. In such a case, the welding generating unit 19 may generate welding prospects 29 in all the components constituting the structure model 21 and the processing similar to the already described embodiments may be performed using the generated welding prospects 29 as initial welding points.

Figure 4:
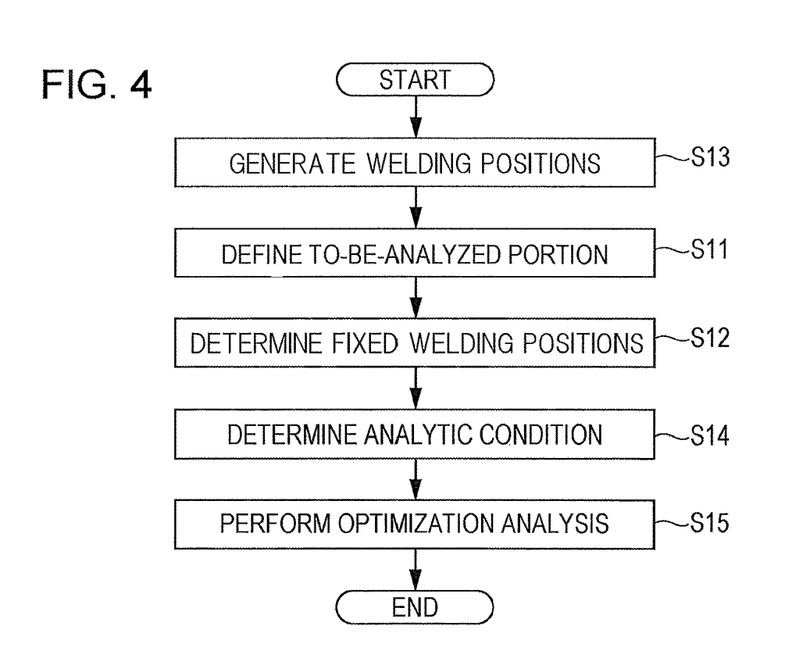
FIG. 4 is a flowchart illustrating a processing flow of a welding-position optimization analyzing apparatus according to another embodiment of the present invention.

FIG. 4 is a flowchart for such a case, and the same steps in which the same processing as the processing in FIG. 3 is performed are denoted by the same reference symbols. Referring to FIG. 4, the following describes the processing flow of the welding optimization analyzing method in the case where initial welding points 25 have not been prepared.

The following description omits the description for the processing that is similar to the one described in the above embodiments.

The structure model 21 stored in the storage device 7 is read and welding prospects 29 at which components constituting the structure model 21 are to be welded together are generated (S13).

After the welding prospects 29 are generated, a to-be-analyzed portion 23, which is to be subjected to analysis, is defined (S11). The fixed-welding defining unit 16 defines a predefined number of fixed welding points 27, the number of which has been defined by, for example, a simple structure analysis or topology optimization from among the welding prospects 29 located in the defined to-be-analyzed portion and generated in Step S13 (S12).

After the fixed welding points 27 have been defined, an analytic condition is defined as in the case of the first embodiment (S14) and optimization processing is performed on the welding prospects 29 located in the to-be-analyzed portion 23 (S15).

As described above, according to an embodiment, welding in a desired to-be-analyzed portion 23 can be optimized even in the case where initial welding positions are not defined in the structure model 21.

The above description has provided, as an example of a method for defining fixed welding points 27, the case where fixed welding points 27, the number of which has been predefined by a simple structure analysis or topology optimization, are defined from among the welding prospects 29 generated as initial welding points.

However, the method for defining fixed welding points or fixed welding portions in the fixed-welding defining step according to the present invention is not limited to the above-described example. An operator may define desired portions other than the welding prospects 29, which have been generated as the initial welding points, as the fixed welding points or the fixed welding portions through the input device 5.

Alternatively, an operator may input appropriate portions other than the generated welding prospects 29 as prospects for fixed welding points or fixed welding portions through the input device 5 and fixed welding points 27, the number of which has been predefined by a simple structure analysis or topology optimization, may be defined from among the input prospects.

Instead, a welding prospect redefining unit, which has functions similar to those of the welding generating unit 19, may automatically reproduce prospects for fixed welding points or fixed welding portions other than the welding prospects 29 generated as the initial welding points and fixed welding points 27, the number of which has been predefined by a simple structure analysis or topology optimization, may be defined from among the reproduced prospects.

In the embodiments described above, a method for automatically generating welding prospects 29 using the welding generating unit has been described as an example of defining welding prospects 29. However, the present invention is not limited to this method. For example, an operator may manually input welding prospects 29 through the input device 5.

EXAMPLES OF THE INVENTION

Hereinbelow, a simulation that has been performed to examine the effect of the present invention is described with reference to embodiments of the invention.

The simulation was performed assuming optimization of welding together components in a to-be-analyzed portion 23, which is a region in the automotive-body structure model 21 illustrated in FIG. 5 surrounded by a rectangular parallelepiped. The simulation was performed in accordance with the procedure of the above-described embodiments under the condition that the initial welding points 25 have been defined at a pitch of 40 mm. The numbers of welding prospects 29 and optimal welding points 31 were defined as 5424 and 347, respectively, in accordance with the properties such as the volume of the to-be-analyzed portion 23. The fixed welding points 27 were defined using topology optimization calculation. In accordance with the results of the topology optimization calculation, 66 prospects having high densities were defined as the fixed welding points 27.

Figure 9:
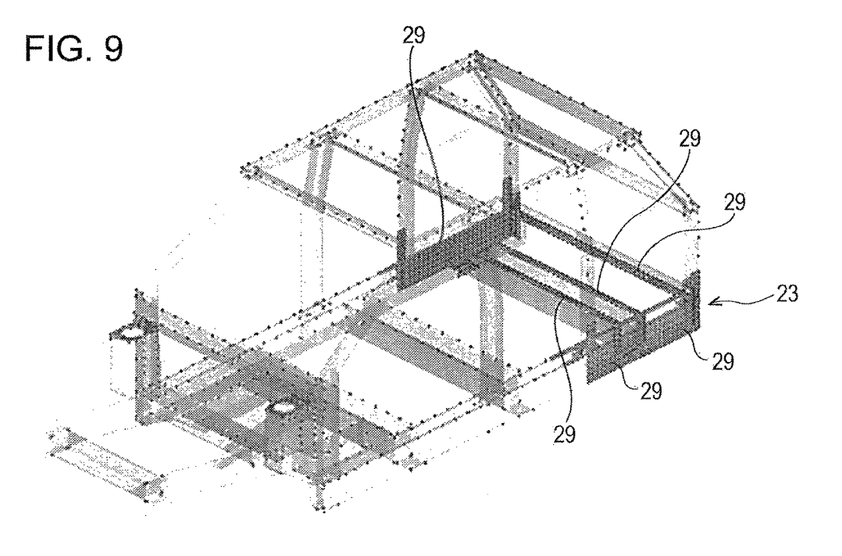
FIG. 9 illustrates a comparative example and a state where welding portions are generated without defining fixed welding points.

For comparison with the effects of the present invention, optimization analysis processing was performed without defining fixed welding points 27, as described below. FIG. 9 illustrates the state where welding prospects 29 were generated in the to-be-analyzed portion 23 in this case and FIG. 10 illustrates the result obtained after topology optimization calculation was performed without defining fixed welding points 27 from among the generated welding prospects 29.

The numbers of final welding points are the same between the cases of the comparative example and the example, which are 413. However, the comparison between FIG. 8 and FIG. 10 reveals that the positions of the optimal welding points 31 differ between FIG. 8 and FIG. 10.

The rigidity analysis was performed on the basis of definition of the optimal welding points calculated in the manners as in the example and the comparative example. Applied analytic conditions included an application of a load of 0.5 kN at one of four portions a, b, c, and d illustrated in FIG. 11, constraining the remaining three portions, and an application of a torsion.

As other analytic conditions, simulations were performed by discretizing or not discretizing the density, by defining or not defining the penalty coefficient or fixed welding points 27, and by generating automatically welding prospects or not generating welding prospects.

The dimensions of the automotive body used for the analysis were 1200 mm in width, 3350 mm in length, and 1130 mm in height. Steel sheets having sheet thicknesses within a range from 0.8 mm to 2.0 mm and a steel material were used. The reference weight is 125 kg and the average torsional rigidity in the original form is 25.1 (kN*m/deg). In this example, a steel-based material was used, but various other materials such as aluminum, titanium, magnesium, glass, resin, or rubber may also be used without causing any problem.

The results of the analysis are shown in Table 1.

TABLE 1

| | No. | Density Discretization | Penalty Coefficient | Definition of Fixed Welding Point | Automatic Generation of Welding Prospects | Rigidity Improvement Rate (%) |
|---|---|---|---|---|---|---|
| Present Invention | 1 | Done | 5 | Done | Done | 16.5 |
| | 2 | Done | 5 | Undone | Done | 12.4 |
| | 3 | Done | 4 | Done | Undone | 10.3 |
| | 4 | Undone | — | Done | Done | 12.6 |
| | 5 | Done | 6 | Done | Undone | 13.2 |
| Comparative Example | 6 | Undone | — | Undone | Undone | −1.5 |
| | 7 | Done | 2 | Undone | Undone | 3 |

As shown in Table 1, in comparison with the comparative examples 6 and 7 in which the rigidity improvement rate negligibly increases, the rigidity improvement rate increases to a large degree in embodiments of the present inventions 1 to 5. These results have proved that the method for constructing a model and the calculation method according to aspects of the present invention appropriately optimize welding points.

Here, the rigidity improvement rate in Table 1 represents the rate at which the rigidity is improved with respect to the reference rigidity of the structure in which the welding points are provided at an initial pitch of 40 mm.

REFERENCE SIGNS LIST 1 welding optimization analyzing apparatus
3 display device
5 input device
7 storage device
9 operation data memory
11 processing unit
13 structure model file
15 to-be-analyzed-portion defining unit
16 fixed-welding defining unit
17 analytic-condition applying unit
18 optimization analyzing unit
19 welding generating unit
21 structure model
23 to-be-analyzed portion
25 initial welding point
27 fixed welding point
29 welding prospect
31 optimal welding point

The invention claimed is:

1. A welding-position optimization analyzing method for optimizing spot welding or continuous welding used to weld together a plurality of components constituting a structure model formed of plane elements and/or three-dimensional elements, comprising:
defining a to-be-analyzed portion including welding points or welding portions at which the plurality of components are welded together;
as preprocessing of an optimization analysis,
performing a structure analysis on a plurality of components, sequencing the welding points or welding portions by the results of the structure analysis and defining a prefixed number of welding points or welding portions having the highest sequence from among all the defined to-be-analyzed portion as fixed welding points or fixed welding portions, or
performing topology optimization on the welding elements of a plurality of the welding components, defining a prefixed number of welding points or welding portions having high densities from among all the defined to-be-analyzed portion as fixed welding points or fixed welding portions;
as the optimization analysis,
excluding defined fixed welding points or fixed welding portions from all the to-be-analyzed portion, specifying welding prospects in the to-be-analyzed portion, the welding prospects being regarded as prospects for the welding points or the welding portions;
defining an analytic condition applied to the to-be-analyzed portion; and
calculating an optimal welding point or an optimal welding portion that satisfies the analytic condition from among the welding prospects.

2. The welding-position optimization analyzing method according to claim 1, wherein the calculating includes discretization of the plane elements and/or the three-dimensional elements using a discretization coefficient defined as four or higher.

3. The welding-position optimization analyzing method according to claim 1, wherein the welding-prospect defining includes generating the welding points or the welding portions, and wherein the welding generating includes defining, from coordinates of the plane elements constituting each of the components, nodes of the elements and disposing a welding element between plane elements spaced such a distance apart as to allow the welding element to be weldbonded after calculating, from coordinate values, an inter-node distance between the node of one of the plane elements of the component, used as a reference, and each of the nodes of plane elements of other components.

4. The welding-position optimization analyzing method according to claim 1, wherein the fixed-welding defining defines at least one of the welding points or the welding portions at which stress, strain, strain energy, or load is significant in the structure analysis as the fixed welding point or the fixed welding portion.

5. A welding-position optimization analyzing method for optimizing spot welding or continuous welding used to weld together a plurality of components constituting a structure model formed of plane elements and/or three-dimensional elements, comprising:

specifying welding prospects regarded as prospects for welding points or welding portions at which the plurality of components are welded;

defining a to-be-analyzed portion including the specified welding prospects;

as preprocessing of an optimization analysis, performing a structure analysis on a plurality of components sequencing the welding points or welding portions by the results of the structure analysis and defining a prefixed number of welding points or welding portions having the highest sequence from among all the defined to-be-analyzed portion as fixed welding points or fixed welding portions, or performing topology optimization on the welding elements of a plurality of the welding components defining a prefixed number of welding points or welding portions having high densities from among all the defined to-be-analyzed portion as fixed welding points or fixed welding portions;

as the optimization analysis, excluding defined fixed welding points or fixed welding portions from all the to-be-analyzed portion and defining an analytic condition applied to the to-be-analyzed portion; and calculating an optimal welding point or an optimal welding portion that satisfies the analytic condition from among the welding prospects.

6. A welding-position optimization analyzing method for optimizing spot welding or continuous welding used to weld a plurality of components constituting a structure model formed of plane elements and/or three-dimensional elements, comprising:

specifying welding prospects regarded as prospects for welding points or welding portions at which the plurality of components are welded;

defining a to-be-analyzed portion including the specified welding prospects;

as preprocessing of an optimization analysis, performing a structure analysis on a plurality of components sequencing the welding points or welding portions by the results of the structure analysis and defining a prefixed number of welding points or welding portions having the highest sequence from among all the defined to-be-analyzed portion as fixed welding points or fixed welding portions, or performing topology optimization on the welding elements of a plurality of the welding components defining a prefixed number of welding points or welding portions having high densities from among all the defined to-be-analyzed portion as fixed welding points or fixed welding portions;

as the optimization analysis, excluding defined fixed welding points or fixed welding portions from all the to-be-analyzed portion and respecifying welding prospects regarded as prospects for welding points or welding portions in the to-be-analyzed portion;

defining an analytic condition applied to the to-be-analyzed portion; and calculating an optimal welding point or an optimal welding portion that satisfies the analytic condition from among the respecified welding prospects.

7. The welding-position optimization analyzing method according to claim 6, wherein the welding-prospect respecifying includes generating the welding points or the welding portions, and wherein the welding generating includes defining, from coordinates of the plane elements constituting each of the components, nodes of the elements and disposing a welding element between plane elements spaced such a distance apart as to allow the welding element to be weldbonded after calculating, from coordinate values, an inter-node distance between the node of one of the plane elements of the component, used as a reference, and each of the nodes of plane elements of other components.

8. An analyzing apparatus that optimizes spot welding or continuous welding used to weld a plurality of components constituting a structure model formed of plane elements and/or three-dimensional elements, comprising:

a processing unit executing a predefined program for implementing:

a to-be analyzed portion defining unit configured to define a to-be-analyzed portion including welding points or welding portions at which the plurality of components are welded;

as preprocessing of an optimization analysis, a fixed-welding defining unit configured to perform a structure analysis on a plurality of components, sequence the welding points or welding portions by the results of the structure analysis and define a prefixed number of welding points or welding portions having the highest sequence from among all the defined to-be-analyzed portion as fixed welding points or fixed welding portions, or configured to perform topology optimization on the welding elements of a plurality of the welding components and define a prefixed number of welding points or welding portions having high densities from among all the defined to-be-analyzed portion as fixed welding points or fixed welding portions;

as the optimization analysis, a welding-prospect specifying unit configured to exclude defining fixed welding points or fixed welding portions from all the to-be-analyzed portion and specify welding prospects in the to-be-analyzed portion, the welding prospects being regarded as prospects for the welding points or the welding portions, the welding prospects being located at a welding portion of the fixed welding point or at the fixed welding portion;

an analytic-condition applying unit configured to define an analytic condition applied to the to-be-analyzed portion; and an optimization analyzing unit configured to calculate an optimal welding point or an optimal welding portion that satisfies the analytic condition from among the welding prospects.

9. The analyzing apparatus according to claim 8, wherein the optimization analyzing unit performs discretization of the plane elements and/or the three-dimensional elements using a discretization coefficient defined as four or higher.

10. The analyzing apparatus according to claim 8,
wherein the welding-prospect defining unit includes a welding generating unit that generates the welding points or the welding portions, and
wherein the welding generating unit defines, from coordinates of the plane elements constituting each of the components, nodes of the elements and disposes a welding element between plane elements spaced such a distance apart as to allow the welding element to be weldbonded after calculating, from coordinate values, an inter-node distance between the node of one of the plane elements of the component, used as a reference, and each of the nodes of plane elements of other components.

11. The analyzing apparatus according to claim 8, wherein the fixed-welding defining unit defines at least one of the welding points or the welding portions at which stress, strain, strain energy, or load is significant in the structure analysis as the fixed welding point or the fixed welding portion.

12. An analyzing apparatus that optimizes spot welding or continuous welding used to weld a plurality of components constituting a structure model formed of plane elements and/or three-dimensional elements, comprising:
a processing unit executing a predefined program for implementing:
a welding-prospect specifying unit configured to specify welding prospects regarded as prospects for welding points or welding portions at which the plurality of components are welded;
a to-be analyzed portion defining unit configured to define a to-be-analyzed portion including the specified welding prospects;
as preprocessing of an optimization analysis,
a fixed welding defining unit configured to perform a structure analysis on a plurality of components, sequence the welding points or welding portions by the results of the structure analysis and define a prefixed number of welding points or welding portions having the highest sequence from among all the defined to-be-analyzed portion as fixed welding points or fixed welding portions, or
configured to perform topology optimization on the welding elements of a plurality of the welding components and define a prefixed number of welding points or welding portions having high densities from among all the defined to-be-analyzed portion as fixed welding points or fixed welding portions;
as the optimization analysis,
an analytic-condition applying unit configured to exclude defined fixed welding points or fixed welding portions from all the to-be-analyzed portion and define an analytic condition applied to the to-be-analyzed portion; and
an analysis unit configured to calculate an optimal welding point or an optimal welding portion that satisfies the analytic condition from among the welding prospects.

13. An analyzing apparatus that optimizes spot welding or continuous welding used to weld a plurality of components constituting a structure model formed of plane elements and/or three-dimensional elements, comprising:
a processing unit executing a predefined program for implementing:
a welding-prospect specifying unit configured to specify welding prospects regarded as prospects for welding points or welding portions at which the plurality of components are welded;
a to-be analyzed portion defining unit configured to define a to-be-analyzed portion including the specified welding prospects;
as preprocessing of an optimization analysis,
a fixed welding defining unit configured to perform a structure analysis on a plurality of components, sequence the welding points or welding portions by the results of the structure analysis and define a prefixed number of welding points or welding portions having the highest sequence from among all the defined to-be-analyzed portion as fixed welding points or fixed welding portions, or
configured to perform topology optimization on the welding elements of a plurality of the welding components and define a prefixed number of welding points or welding portions having high densities from among all the defined to-be-analyzed portion as fixed welding points or fixed welding portions;
as the optimization analysis,
an analytic-condition applying unit configured to exclude defined fixed welding points from all the to-be-analyzed portion and respecify welding prospects regarded as prospects for welding points or welding portions in the to-be-analyzed portion;
the analytic-condition applying unit further configured to define an analytic condition applied to the to-be-analyzed portion; and
an optimization analyzing unit configured to calculate an optimal welding point or an optimal welding portion that satisfies the analytic condition from among the respecified welding prospects.

14. The analyzing apparatus according to claim 13,
wherein the welding-prospect redefining unit includes a welding generating unit that generates the welding points or the welding portions, and
wherein the welding generating unit defines, from coordinates of the plane elements constituting each of the components, nodes of the elements and disposes a welding element between plane elements spaced such a distance apart as to allow the welding element to be weldbonded after calculating, from coordinate values, an inter-node distance between the node of one of the plane elements of the component, used as a reference, and each of the nodes of plane elements of other components.

\* \* \* \* \*